United States Patent
Huang et al.

(10) Patent No.: US 10,967,559 B2
(45) Date of Patent: Apr. 6, 2021

(54) 3D PRINTED OBJECT WITH EMBEDDED SENSING DEVICE

(71) Applicant: Hewlett-Packard Development Company, L.P., Spring, TX (US)

(72) Inventors: Wei Huang, Palo Alto, CA (US); Lihua Zhao, Palo Alto, CA (US); Gary J. Dispoto, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/462,679

(22) PCT Filed: Feb. 14, 2017

(86) PCT No.: PCT/US2017/017825
§ 371 (c)(1),
(2) Date: May 21, 2019

(87) PCT Pub. No.: WO2018/151706
PCT Pub. Date: Aug. 23, 2018

(65) Prior Publication Data
US 2019/0351607 A1    Nov. 21, 2019

(51) Int. Cl.
| | |
|---|---|
| *B29C 64/10* | (2017.01) |
| *G01N 27/04* | (2006.01) |
| *B33Y 10/00* | (2015.01) |
| *B33Y 30/00* | (2015.01) |
| *B33Y 50/02* | (2015.01) |
| *B33Y 80/00* | (2015.01) |
| *B29C 64/393* | (2017.01) |

(Continued)

(52) U.S. Cl.
CPC ............ *B29C 64/10* (2017.08); *B29C 64/393* (2017.08); *B29C 70/70* (2013.01); *B29C 70/882* (2013.01);
(Continued)

(58) Field of Classification Search
CPC ....... B29C 64/10; B33Y 10/00; G01N 27/041
See application file for complete search history.

(56) References Cited

U.S. PATENT DOCUMENTS 7,621,193 B2  11/2009 Fay et al.
8,059,008 B2  11/2011 Marincak
(Continued)

FOREIGN PATENT DOCUMENTS

CN  105408095 A   3/2016
CN  106313573     1/2017
(Continued)

OTHER PUBLICATIONS

Roberson, et al., Expanding the Impact of Polymeric-Based 3D Printing Technologies, Jun. 14, 2015.

*Primary Examiner* — Reena Aurora
(74) *Attorney, Agent, or Firm* — Mannava & Kang (57) ABSTRACT

According to an example, a three-dimensional (3D) printed object may include a body formed of an electrically non-conductive material. In addition, an electrically conductive channel, a sensing device, and a signal emitter may be embedded within the body. The sensing device may be in electrical communication with the electrically conductive channel such that the sensing device is affected by a disruption in a current applied through the electrically conductive channel. In addition, the signal emitter may emit a wireless signal in response to the sensing device being affected by a disruption in the applied current.

15 Claims, 5 Drawing Sheets

(51) Int. Cl.
    *B29C 70/70*           (2006.01)
    *B29C 70/88*           (2006.01)
    *B29L 31/34*            (2006.01)

(52) U.S. Cl.
    CPC ............... *B33Y 10/00* (2014.12); *B33Y 30/00* (2014.12); *B33Y 50/02* (2014.12); *B33Y 80/00* (2014.12); *G01N 27/041* (2013.01); *G01N 27/045* (2013.01); *B29K 2995/0007* (2013.01); *B29L 2031/34* (2013.01)

(56) References Cited

U.S. PATENT DOCUMENTS

| | | | |
|---|---|---|---|
| 9,887,356 B2* | 2/2018 | McAlpine | B29C 64/106 |
| 2015/0201500 A1* | 7/2015 | Shinar | B29C 64/135 |
| | | | 425/132 |
| 2015/0226579 A1 | 8/2015 | Nino et al. | |
| 2015/0366074 A1 | 12/2015 | Nagarajan et al. | |
| 2016/0298691 A1 | 10/2016 | Dowie et al. | |
| 2016/0325541 A1 | 11/2016 | Lavrentyev et al. | |
| 2016/0349215 A1 | 12/2016 | Todorov | |
| 2019/0134898 A1* | 5/2019 | Zhao | B29C 64/20 |
| 2019/0143605 A1* | 5/2019 | Huang | B33Y 30/00 |
| | | | 425/135 |

FOREIGN PATENT DOCUMENTS

| | | |
|---|---|---|
| KR | 102016002387 | 3/2016 |
| WO | WO-2012048237 | 4/2012 |
| WO | WO-2014209994 | 12/2014 |
| WO | WO-2016094827 A1 | 6/2016 |
| WO | WO-2016146374 A1 | 9/2016 |

* cited by examiner

3D PRINTED OBJECT WITH EMBEDDED SENSING DEVICE

BACKGROUND 3D manufacturing apparatuses that employ additive manufacturing techniques to build or print parts are gaining in popularity and use. Some additive manufacturing techniques employ a layering process in which particles of build material are spread into a layer and selectively fused together. Following that process, additional particles are spread into another layer and fused together. This process may be repeated for a number of times to build up a 3D part having a desired configuration.

BRIEF DESCRIPTION OF THE DRAWINGS

Features of the present disclosure are illustrated by way of example and not limited in the following figure(s), in which like numerals indicate like elements, in which.

DETAILED DESCRIPTION

Disclosed herein are 3D printed objects and methods and apparatuses for fabricating the 3D printed objects. The 3D printed objects disclosed herein may include a body formed of an electrically non-conductive material. Embedded within the body may be an electrically conductive channel, a sensing device in electrical communication with the electrically conductive channel, and a signal emitter. The sensing device may be affected by a disruption in a current applied through the electrically conductive channel and the signal emitter may emit a wireless signal in response to the sensing device being affected by the disruption. Also embedded within the body may be an electrical current supplying device such as a battery and/or an inductive energy to electrical energy converter. The electrical current supplying device may supply current to the electrically conductive channel and the signal emitter.

The electrically conductive channel, the sensing device, the signal emitter, and the electrical current supplying device may be arranged during additive formation of the body. For instance, some or all of these components may be formed through application and mixing of various fusing and/or electrically conductive agents with electrically non-conductive material particles used to additively form the body. In other examples, some or all of these components may be formed prior to introduction into the body and the previously formed components may be placed onto layers of the body during formation of the body.

Objects may fail as a result of breakage and/or wear. Breakage failure may be caused by mechanical overload, fatigue, stress corrosion cracking, etc. For fatigue and stress corrosion cracking, a fracture may appear and may propagate before the object suddenly breaks. Therefore, spotting cracks in their early stage may enable the prevention of an object break failure, which may avoid damage to an entire system in which the object is included. However, manual inspection for cracks is unreliable and laborious, especially when the cracks are tiny or narrow.

Through implementation of the methods and apparatuses disclosed herein, 3D printed objects may be fabricated with embedded sensing devices and signal emitters to automatically detect and inform of fractures in the 3D printed objects. For instance, when failures such as fractures occur in the 3D printed objects, the fractures may cause a break in the electrically conductive channel. The embedded sensing devices may be affected by the break and the signal emitter may output a signal to indicate that a break has occurred. The fractures may thus be detected and located without destroying the 3D printed objects, e.g., in a non-destructive manner, without manual inspection of the 3D printed objects for fractures, in real-time or intermittently, without substantially influencing the 3D printed objects' physical properties, without being visible on exteriors of the 3D printed objects, without substantially limiting the geometries of the 3D printed objects, etc.

Before continuing, it is noted that as used herein, the terms "includes" and "including" mean, but are not limited to, "includes" or "including" and "includes at least" or "including at least." The term "based on" means, but is not limited to, "based on" and "based at least in part on."

Figure 1A:
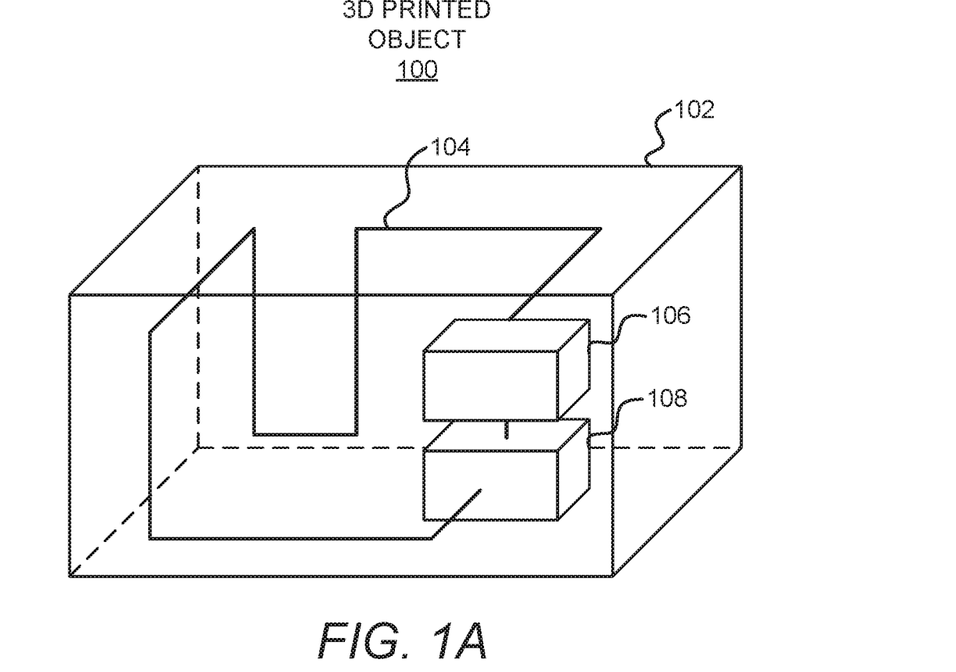
FIG. 1A shows a simplified isometric view of an example three-dimensional (3D) printed object in which interior components are depicted as being visible.

With reference first to FIG. 1A, there is shown a simplified isometric view of an example three-dimensional (3D) printed object 100 in which interior components are depicted as being visible. It should be understood that the 3D printed object 100 depicted in FIG. 1A may include additional components and that some of the components described herein may be removed and/or modified without departing from a scope of the 3D printed object 100 disclosed herein.

The 3D printed object 100 may be printed through any suitable additive 3D printing or manufacturing technique. The 3D printing or manufacturing technique may include a powder-based fusing technique, which includes the application of fusing agent onto selected areas of build material particles along with subsequent heating and solidification of the build material particles upon which the fusing agent has been deposited. Other suitable techniques may include stereolithography (SLA), fused deposition modeling (FDM), curable liquid photopolymer jetting (Polyjet), selective laser sintering (SLS), selective laser melting (SLM), 3D binder jetting, or the like. In any regard, the 3D printed object 100 may include a body 102 formed of an electrically non-conductive material. The electrically non-conductive material may be a plastic, a ceramic, a polymer, or the like, material. The electrically non-conductive material has been depicted as being transparent in FIG. 1A for purposes of illustration but it should be understood that the electrically non-conductive material may be transparent or opaque or may include opaque and transparent sections.

During the additive 3D printing process, the 3D printed object 100 may be formed to include various sensing components to sense fractures, such as cracks, breaks, etc., in the body 102. The fractures may occur in the body 102 during fabrication or over time following fabrication of the body 102 due to mechanical overload, fatigue, stress corrosion cracking, or the like. As shown in FIG. 1A, the sensing components may include an electrically conductive channel 104 (which is also referred to herein as an electrically conductive component) positioned to extend through certain locations in the body 102. The electrically conductive channel 104 may be a wire or other component through which an electrical current may be conducted from a battery or other source (not shown) as discussed in greater detail therein. In this regard, the electrically conductive channel 104 may be formed as a closed loop such that an electrical current may be applied through the electrically conductive channel 104. Additionally, the electrically conductive channel 104 may be formed to extend through certain areas of the body 102 in any direction including, horizontal, vertical, diagonal, and other directions therebetween and multiple electrically conductive channels 104 may be formed. By embedding the electrically conductive channel(s) 104 inside the body 102, the electrically conductive channel(s) 104 may be protected from corrosive environments and/or may enhance the appearance of the 3D object because the electrically conductive channel 104 may be concealed.

The electrically conductive channel 104 may extend through locations of the body 102 that may be prone to fracturing, locations of the body 102 that may be critical, and the like. By way of particular example, the electrically conductive channel 104 may be positioned to extend near outer surfaces of the body 102 as those areas may fracture more readily than inner areas of the body 102. In addition or as another example, the electrically conductive channel 104 may be positioned to extend through relatively thin portions of the body 102. As another example, the electrically conductive channel 104 may be positioned to extend through portions of the body 102 that may be critical to the 3D printed object 100, e.g., portions that may be critical to the operation and performance of the 3D printed object 100 or other objects. In other examples, the electrically conductive channel 104 may extend through other locations of the body 102 that may not be critical. In any regard, the arrangement of the electrically conductive channel 104 through the interior of the body 102 may enable non-destructive fracture sensing to be performed on the 3D printed object 100.

A sensing device 106 may be positioned to be affected by a disruption in a flow of electrical current through the electrically conductive channel 104. That is, electrical current may flow through the sensing device 106 when the flow of electrical current through the electrically conductive channel 104 is not disrupted. However, when the flow of electrical current through the electrically conductive channel 104 is disrupted, electrical current flow through the sensing device 106 may also be changed either discretely or continuously. The flow of electrical current through the electrically conductive channel 104 may be disrupted, for instance, when a partial or complete break occurs in the electrically conductive channel 104 as may occur when a portion of the body 102 through which the electrically conductive channel 104 runs fractures. The sensing device 106 may include a resistor or other device that may be affected by a disruption in electrical current applied through the electrically conductive channel 104. In other words, the sensing device 106 may be any suitable device that may be affected by changes in electrical current flowing through an electrical circuit containing the electrically conductive channel 104.

As also shown in FIG. 1A, the 3D printed object 100 may include a signal emitter 108 embedded in the body 102. According to examples, the signal emitter 108 may emit a wireless signal in response to the sensing device 106 being affected by a disruption in the electrical current applied through the electrically conductive channel 104. For instance, the signal emitter 108 may detect when the sensing device 106 has been affected by a disruption in the electrical current flowing through the electrically conductive channel 104 and may emit a wireless signal when such a detection is made.

The wireless signal may be a Bluetooth™ signal, a wifi signal, an electromagnetic signal, e.g., a radio frequency signal, or the like. The wireless signal may also or in other examples be an acoustic, optical, or the like, signal. In examples in which the wireless signal is an acoustic or optical signal, the body 102 may be formed to include an opening through which the acoustic or optical signal may be directed out of the body 102. In some examples, the signal emitter 108 may emit a new wireless signal, e.g., may start emitting a wireless signal in response to the sensing device 106 being affected by a disruption in the current flowing through the electrically conductive channel 104. In other examples in which the signal emitter 108 is already emitting a wireless signal, the signal emitter 108 may modify the wireless signal.

In any case, a reading device (not shown) may receive the emitted wireless signal and a determination may be made by the reading device, a user, or both that the electrical current flow through the electrically conductive channel 104 has been disrupted. In addition, the detected disruption may be interpreted as an indication that a fracture has occurred in the body 102 and that the fracture is of sufficient size to have disrupted the flow of current through the electrically conductive channel 104. Once a determination has been made that a fracture is likely to have occurred, an electrical wire tracing device that may employ electromagnets may be used to identify the location at which the electrically conductive channel 104 has been fractured.

Although the sensing device 106 and the signal emitter 108 have been depicted as being separate elements, according to examples, the sensing device 106 and the signal emitter 108 may be a combined element, which is discussed as the signal emitter 108. The sensing device 106 and the signal emitter 108 may be formed as a combined element (e.g., the signal emitter 108) prior to placement in the body 102 or may be formed as a combined element during formation of the body 102. In these examples, the combined element may automatically emit a wireless signal when a disruption in the flow of electrical current through the electrically conductive channel 104 occurs. Additionally or in other examples, the sensing device 106 and the signal emitter 108 may be embedded in the body 102 at locations that may not adversely affect the structural integrity of the body 102 or otherwise weaken the body 102. In other words, the sensing device 106 and the signal emitter 108 may be embedded in non-critical locations of the body 102.

Figure 1B:
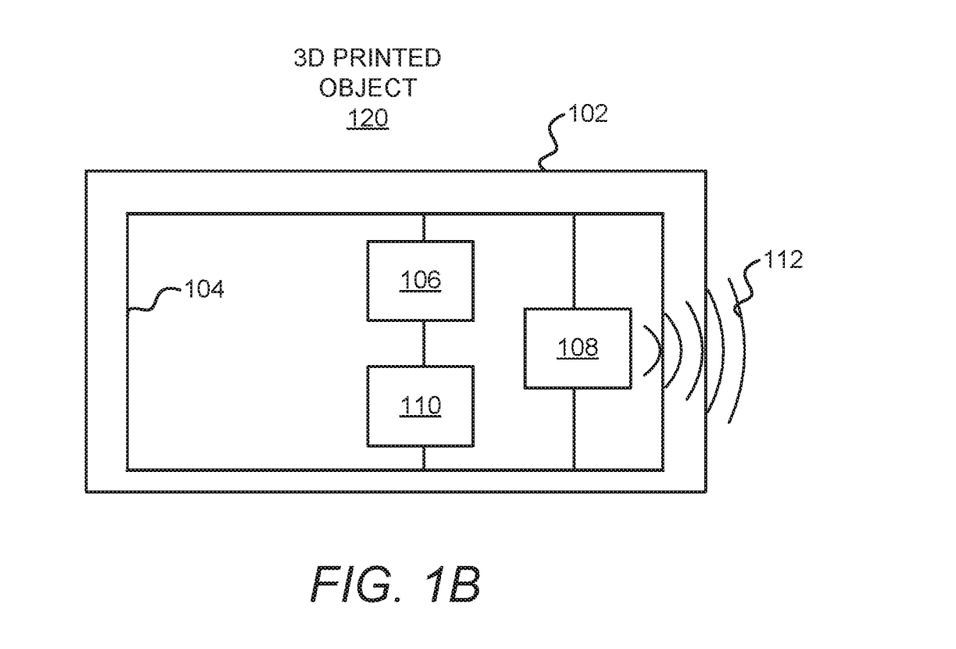
FIGS. 1B-1D, respectively, show simplified block diagrams for other example 3D printed objects.
Figure 1C:
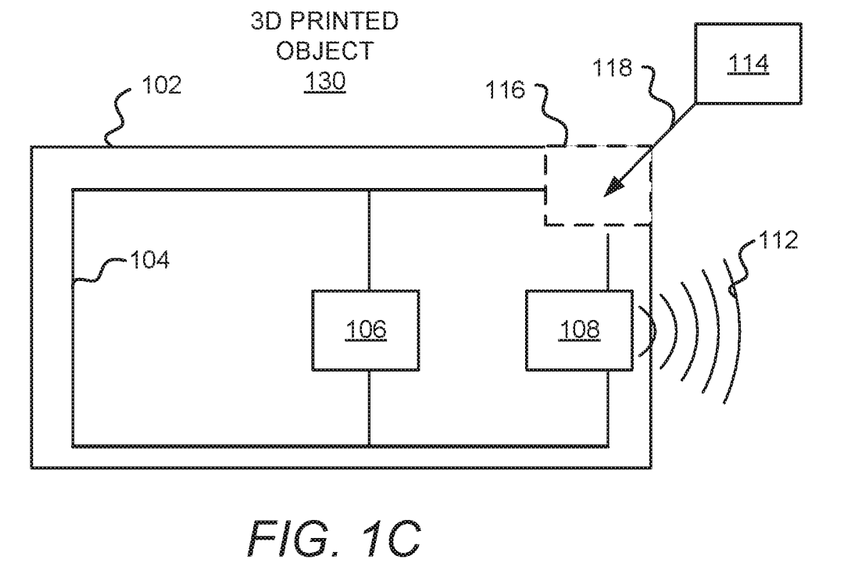
Figure 1D:
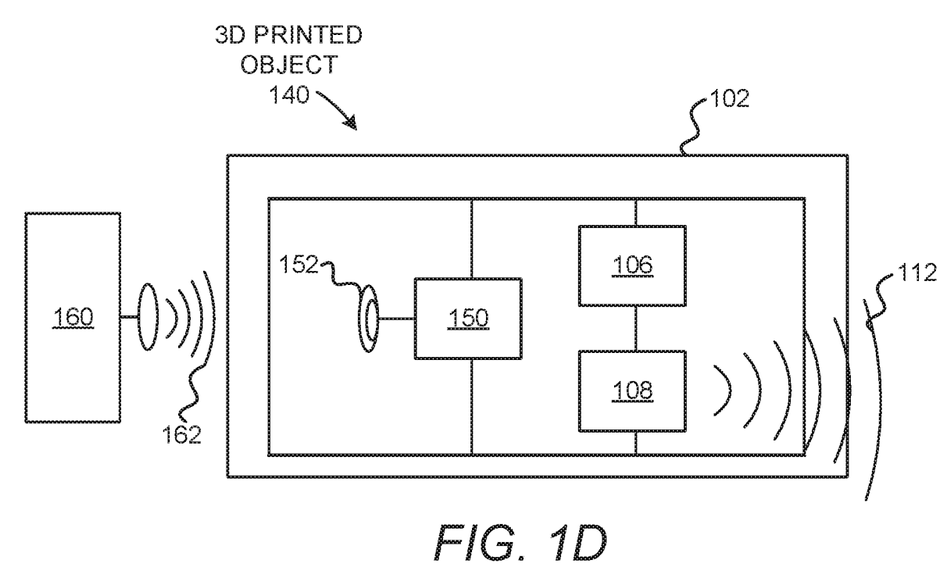

Turning now to FIGS. 1B-1D, there are respectively shown simplified block diagrams of other example 3D printed objects 120, 130, 140. It should be understood that the 3D printed objects 120, 130, 140 depicted in FIGS. 1B-1D may include additional components and that some of the components described herein may be removed and/or modified without departing from the scopes of the 3D printed objects 120, 130, 140 disclosed herein.

Each of the 3D printed objects 120, 130, 140 may include a body 102 formed of an electrically non-conductive material, an electrically conductive channel 104, a sensing device 106, and a signal emitter 108. The components 102-108 may be similar to the respective components 102-108 depicted in FIG. 1A and discussed above with respect to the 3D printed object 100. As such, detailed descriptions of these components 102-108 are not repeated with respect to FIGS. 1B-1D.

It should, however, be noted that the sensing device 106 and the signal emitter 108 may be formed as a combined element as discussed above.

With reference first to FIG. 1B, the 3D printed object 120 may include a battery 110 in electrical communication with the sensing device 106 and the signal emitter 108. The battery 110 may supply an electrical current through the electrically conductive channel 104. The battery 110 may also supply electrical current to the signal emitter 108 such that the signal emitter 108 may emit a wireless signal 112 in response to the sensing device 106 being affected by a disruption in the electrical current flowing through the electrically conductive channel 104.

With reference now to FIG. 1C, the 3D printed object 130 is depicted as including a removable battery 114. That is, the 3D printed object 130 may be formed with a slot 116 into which the removable battery 114 may be inserted, as shown by the arrow 118. As shown, the electrically conductive channel 104 may include electrical connections that end at the slot 114. Although not explicitly shown, the removable battery 114 may also include electrical connections that respectively mate or come into electrical contact with the electrical connections of the electrically conductive channels 104 when the removable battery 114 is inserted into the slot 116. In one regard, the removable battery 114 may be replaced, for instance, once the removable battery 114 has been spent.

With reference now to FIG. 1D, the 3D printed object 140 may include a power converter 150 that is to convert inductive energy into electrical energy. Particularly, the power converter 150 may be coupled to an antenna 152 that is to receive inductive energy. As shown in FIG. 1D, an inductive energy source 160 may generate and emit inductive energy 162 toward the 3D printed object 140. According to an example, the inductive energy source 160 may be implemented to direct inductive energy 162 toward the 3D printed object 140 when a determination is to be made as to whether electrical current flow through the electrically conductive channel 140 has been disrupted. In this regard, the 3D printed object 140 may not include a battery, but instead, may be powered as desired.

When inductive energy 162 is directed to the power converter 150, the power converter 150 may convert the received inductive energy into electrical energy through any suitable wireless power transfer techniques. In addition, the power converter 150 may supply the electrical energy as an electrical current through the electrically conductive channel 104. The sensing device 106 may be affected by a disruption in the flow of electrical current through the electrically conductive channel 104 and the sensing device 108 may emit a wireless signal 112 in response to the sensing device 106 being affected by the disruption.

Figure 2A:
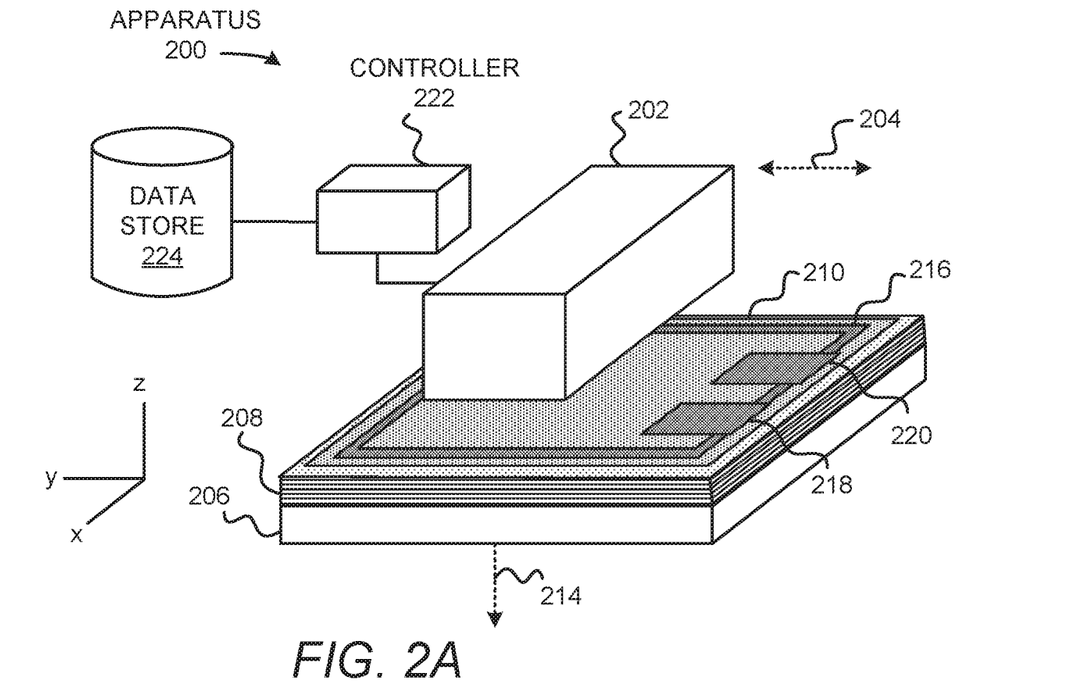
FIGS. 2A and 2B, respectively, show example apparatuses that may be implemented to fabricate the 3D printed objects depicted in FIGS. 1A-1D.
Figure 2B:
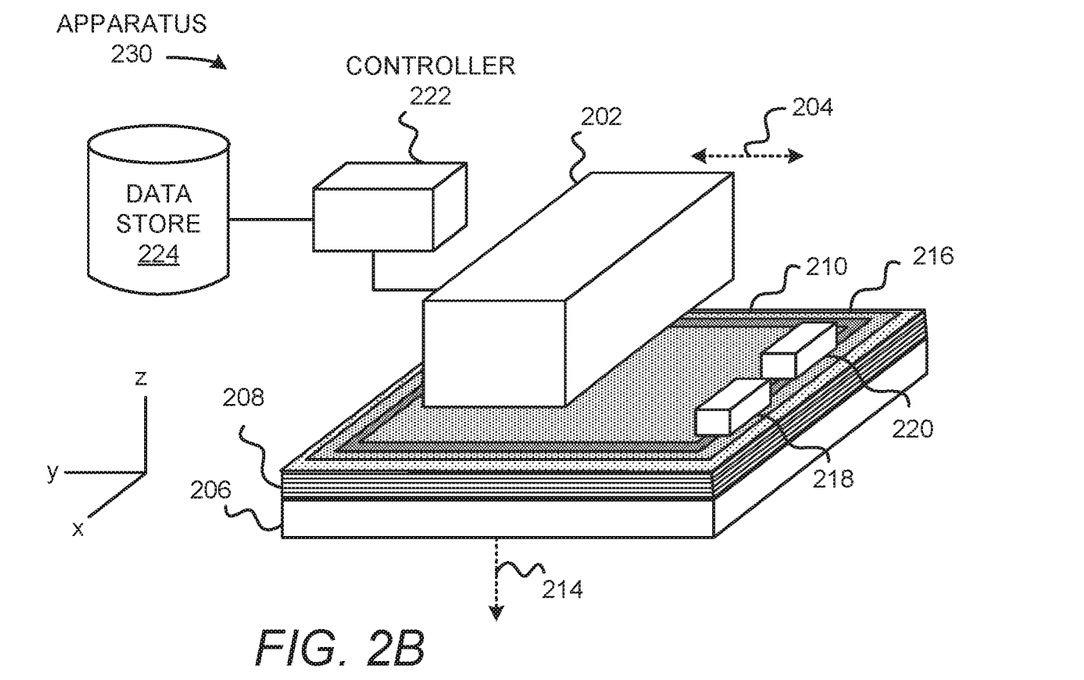

With reference now to FIGS. 2A and 2B, there are respectively shown example apparatuses 200, 230 that may be implemented to print/fabricate any of the 3D printed objects 100, 120-140. It should be understood that the apparatuses 200, 230 depicted in FIGS. 2A and 2B may include additional components and that some of the components described herein may be removed and/or modified without departing from scopes of the apparatuses 200, 230 disclosed herein.

Each of the apparatuses 200, 230 may be a three-dimensional (3D) printer and may include forming components as represented by the element 202. The forming components 202 may include, for instance, various components for additively printing/fabricating a body 102 of a 3D printed object 100, 120-140. In an example in which the apparatuses 200, 230 are 3D printers that implement a powder-based fusing technique, the forming components 202 may include a recoater, a fusing device, a fusing agent delivery device, etc. In an example in which the apparatuses 200, 230 are fused deposition modeling 3D printers, the components may include an extrusion nozzle, a reservoir for holding the fusing material, etc. In any regard, some or all of the forming components 202 may be scanned as denoted by the arrow 204 across a print bed 206 to print/fabricate a body 102 of a 3D printed object 100, 120-140.

The forming components 202 may be implemented to form a body 102 from a plurality of layers 208 of a build material on the print bed 206. That is, for instance, the forming components 202 may include components for applying layers 208 of the build material, which may be particles of electrical non-conductive material in powder form. In addition, the forming components 202 may include components for selectively fusing the build material particles in certain areas of each layer to form the body 102. In FIGS. 2A and 2B, a portion 210 of the body 102 is depicted as being formed on a topmost layer 208. It should be understood that other portions of the body 102 may also be formed in some or all of the other layers 208. According to an example, the forming components 202 may move as indicated by the arrow 204 to form the portions 210 of the body 102 on the respective layers. Additionally, the print bed 206 may move in the direction denoted by the arrow 214 to enable additional portions 210 of the body 102 to be formed in multiple layers 208.

As shown in FIGS. 2A and 2B, the forming components 202 may also form various components for sensing fractures and signaling when fractures are sensed such that the various components are embedded within the body 102. For instance, the forming components 202 may arrange an electrically conductive channel 216 in one or more of the layers 208. That is, the electrically conductive channel 216 may be arranged to extend through certain areas of the body 102 in any direction including, horizontal, vertical, diagonal, and other directions therebetween. Thus, for instance, the electrically conductive channel 216 may extend across multiple layers 208, e.g., extend in the z direction in addition to the x and y directions.

According to examples, the electrically conductive channel 216 may be arranged through application of electrically conductive material, e.g., metallic ink or other electrically conductive material in fluid form, onto selected locations of the layer 208 or layers 208. In these examples, the forming components 202 may include a delivery device for delivering a fusing agent and a delivery device for delivering the electrically conductive material onto the layers 208 of the build material particles such that the electrically conductive material may mix with the electrically non-conductive build material particles. In other examples, the electrically conductive channel 216 may be formed prior to being arranged on the layer 208. In these examples, the forming components 202 may include a device for laying the formed electrically conductive channel 216 on the layer 208.

The forming components 202 may also arrange a sensing device 218 and a signal emitter 220 in a layer 208 or across multiple layers 208. According to examples, and as shown in FIG. 2A, the forming components 202 may form the sensing device 218, the signal emitter 220, or both from the build material particles in multiple layers 208. In these examples, the forming components 202 may include multiple fluid delivery devices for delivering different types of fluids or agents onto the build material particles such that the different types of fluids or agents mix with the electrically non-conductive build material particles to form parts of the sensing device 218, the signal emitter 220, or both. In instances in which the sensing device 218 and/or the signal emitter 220 are unable to be formed through application of different fluids onto the build material particles, the forming components 202 may additionally include a device for arranging previously formed elements for either or both of the sensing device 218 and the signal emitter 220 that may not be formed through application of various fluids. In any regard, the forming components 202 may arrange the electrically conductive channel 216 to be electrically connected to appropriate locations on the sensing device 218 and the signal emitter 220.

In other examples, and as shown in FIG. 2B, the forming components 202 may arrange the electrically conductive channel 216 as discussed above with respect to FIG. 2A. However, in the apparatus 230 in FIG. 2B, the forming components 202 may arrange the sensing device 218 and the signal emitter 220 by placing a previously fabricated sensing device 218 and a previously fabricated signal emitter 220 to extend among multiple layers 208. In these examples, the forming components 202 may include a manipulating device for grasping the previously fabricated sensing device 218 and the previously fabricated signal emitter 220 and placing them onto the layer 208. In any regard, the forming components 202 may arrange the electrically conductive channel 216 to be electrically connected to appropriate locations on the placed sensing device 218 and signal emitter 220. In addition, the forming components 202 may continue to form the body 102 around the placed sensing device 218 and signal emitter 220. In any of the examples discussed above with respect to FIGS. 2A and 2B, the forming components 202 may arrange the sensing device 218 and the 220 as a combined element instead of as separate elements. In addition, or in other examples, the previously fabricated sensing device 218 and the previously fabricated signal emitter 220 may be placed manually to extend among the multiple layers 208. In these examples, the electrical connections between the sensing device 218 and the signal emitter 220 may be arranged manually or by the forming components 202.

Although not shown in FIGS. 2A and 2B, a battery 110, a power converter 150 (FIGS. 1B-1D), or both, may also be arranged to be embedded inside the body 102 during fabrication of the body 102. That is, for instance, the forming components 202 may also arrange the battery 110 and/or the power converter 150 through either or both of printing and placing of elements of the battery 110 and/or the power converter 150 on a single or multiple layers 208 during fabrication of the body 102. In other examples, the battery 110 and/or the power converter 150 may be arranged manually to be embedded inside the body 102. The battery 110 and/or the power converter 150 may be arranged during fabrication of the body 102 in any of the manners discussed above with respect to FIGS. 1B-1D.

The apparatuses 200, 230 may also include a controller 222 that is to control operations of the forming components 202. The controller 222 may be a computing device, a semiconductor-based microprocessor, a central processing unit (CPU), an application specific integrated circuit (ASIC), and/or other type of hardware device. The controller 222 may be in communication with a data store 224, which may be a Random Access Memory (RAM), an Electrically Erasable Programmable Read-Only Memory (EEPROM), a storage device, an optical disc, and the like. The data store 224 may have stored thereon data pertaining to a 3D part to be printed by the apparatus 200, 230. For instance, the data may include the locations in each layer 208 at which portions of the body 102, the electrically conductive channel 216, the sensing device 218, the signal emitter 220, the battery 110, the power converter 150, or the like, are to be arranged.

Figure 3:
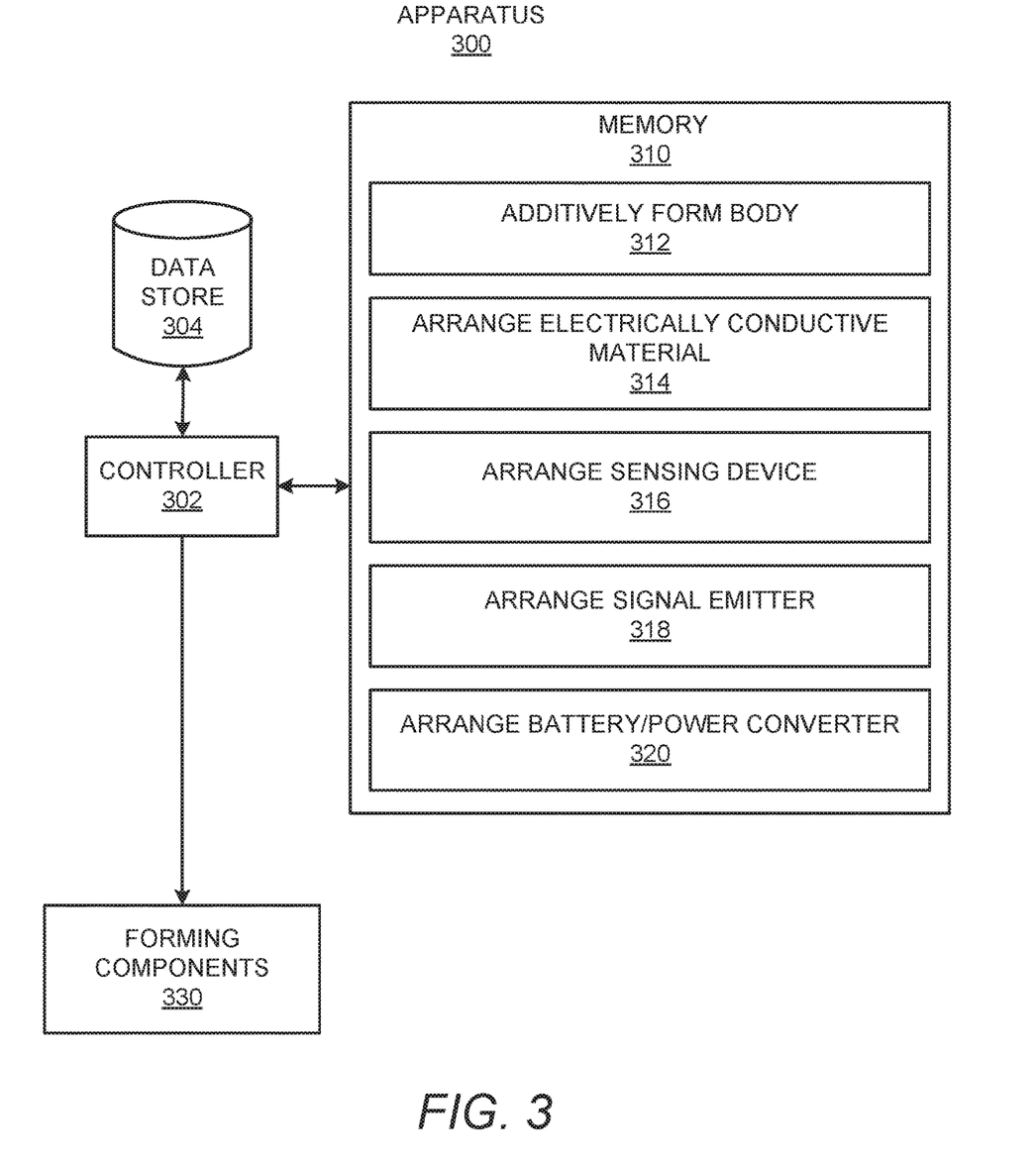
FIG. 3 shows a simplified block diagram of another example apparatus.

With reference now to FIG. 3, there is shown a simplified block diagram of another example apparatus 300. The apparatus 300 may include a controller 302 that may control operations of the apparatus 300 and may be a semiconductor-based microprocessor, a central processing unit (CPU), an application specific integrated circuit (ASIC), field-programmable gate array (FPGA), and/or other hardware device. The apparatus 300 may also include a memory 310 that may have stored thereon machine readable instructions 312-320 (which may also be termed computer readable instructions) that the controller 302 may execute. The memory 310 may be an electronic, magnetic, optical, or other physical storage device that contains or stores executable instructions. The memory 310 may be, for example, Random Access Memory (RAM), an Electrically Erasable Programmable Read-Only Memory (EEPROM), a storage device, an optical disc, and the like. The memory 310, which may also be referred to as a computer readable storage medium, may be a non-transitory machine-readable storage medium, where the term "non-transitory" does not encompass transitory propagating signals.

The apparatus 300 may be a computing device such as a personal computer, a laptop computer, a smartphone, a server computer, a tablet computer, or the like. In other examples, the apparatus 300 may be or form part of a 3D fabricating device. The controller 302 may communicate instructions to a 3D fabricating device or to forming components 330 over a network, through a wired connection, a bus, or the like.

With reference to FIGS. 2A, 2B, and 3, the controller 302 may fetch, decode, and execute the instructions 312 to additively form a body 102 from an electrically non-conductive material. During additive formation of the body 102, the controller 302 may fetch, decode, and execute the instructions 314-320. Particularly, the controller 302 may execute the instructions 314 to arrange electrically conductive material to form an embedded electrically conductive channel 216 inside the body 102. In addition, the controller 302 may execute the instructions 316 and the instructions 318 to respectively arrange a sensing device 218 and a signal emitter 220 inside the body 102. The controller 302 may also execute the instructions 320 to arrange at least one of a battery and a power converter inside the body 102.

Figure 4:
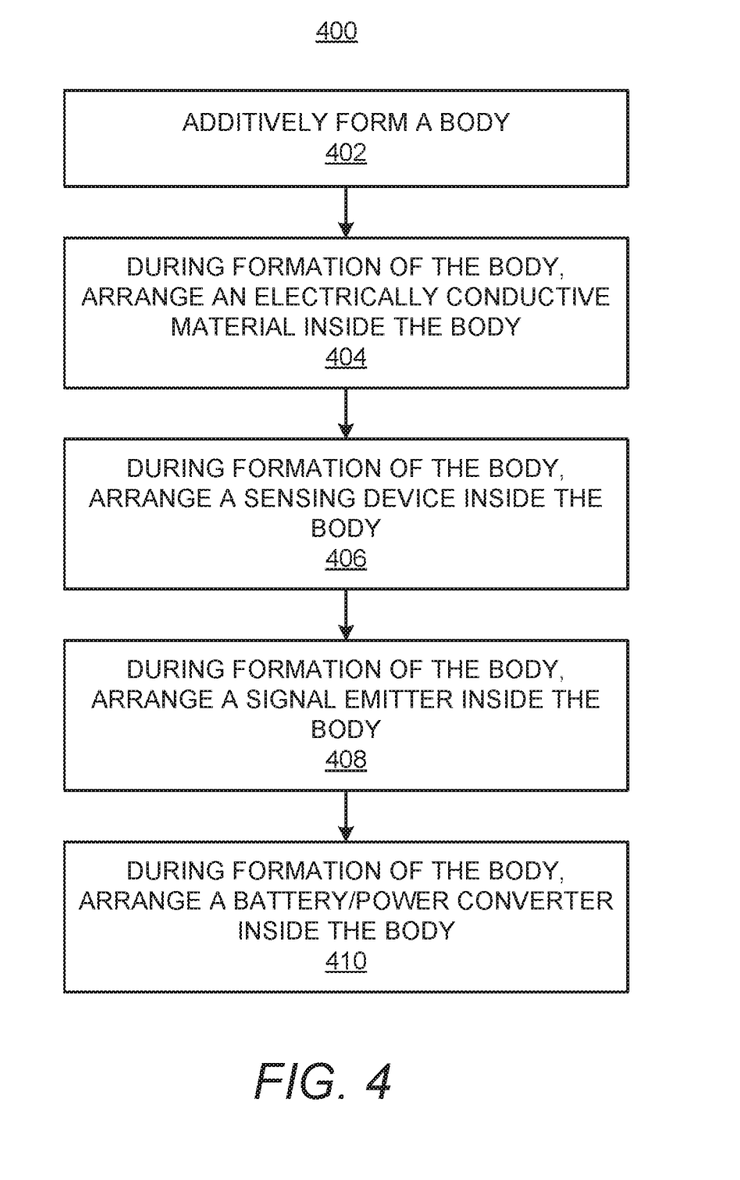
FIG. 4 shows a flow diagram of an example method for fabricating a 3D printed object with embedded sensing components.

Various manners in which the apparatus 300 may be implemented are discussed in greater detail with respect to the method 400 depicted in FIG. 4. Particularly, FIG. 4 depicts a flow diagram of an example method 400 for fabricating a 3D printed object with embedded sensing components. It should be understood that the method 400 depicted in FIG. 4 may include additional operations and that some of the operations described therein may be removed and/or modified without departing from the scope of the method 400. The description of the method 400 is made with reference to the features depicted in FIGS. 1A-3 for purposes of illustration.

Generally speaking, the controller 302 of the apparatus 300 may implement or execute some or all of the instructions 312-320 stored on the memory 310 to perform the method 400. Prior to or as part of the execution of the method 400, the controller 302 may execute instructions (not shown) to identify a 3D printed object 100, 120-140 to be fabricated. For instance, the controller 302 may access information, such as computer aided design information of the 3D printed object 100, 120-140, which may be stored in the data store 304. The computer aided design information may identify the physical characteristics of the 3D printed object 100, 120-140, for instance, the shapes and dimensions of the 3D printed object 100, 120-140.

At block 402, the controller 302 may execute the instructions 312 to additively form a body 102 from an electrically non-conductive material. Particularly, for instance, the controller 302 may execute the instructions 312 to control the forming components 202 to form portions 210 of the body 102 in multiple layers 208 as discussed above with respect to FIGS. 2A and 2B.

At block 404, the controller 302 may execute the instructions 314 to arrange electrically conductive material inside the body 102 to form an embedded electrically conductive component or channel 216 during additive formation of the body 102. That is, for instance, the controller 302 may execute the instructions 314 to control the forming components 202 to arrange the electrically conductive component 216 on one or more layers 208 of build materials as discussed above with respect to FIGS. 2A and 2B.

At block 406, the controller 302 may execute the instructions 316 to arrange a sensing device 218 inside the body 102. The controller 302 may execute the instructions 316 to control the forming components 202 to arrange the sensing device 218 on one or more layers 208 of build materials as discussed above with respect to FIGS. 2A and 2B.

At block 408, the controller 302 may execute the instructions 318 to arrange a signal emitter 220 inside the body 102. The controller 302 may execute the instructions 318 to control the forming components 202 to arrange the signal emitter 220 on one or more layers 208 of build materials as discussed above with respect to FIGS. 2A and 2B. Blocks 406 and 408 may be combined into a single operation, for instance, in examples in which the sensing device 218 and the signal emitter 220 are formed as a combined component.

As also discussed above, the controller 302 may control the forming components 202 to electrically connect the sensing device 218 and the signal emitter 220 to the electrically conductive component 216. According to an example, the sensing device 218 may be affected by a disruption in the flow of current through the electrically conductive component 216. That is, for instance, flow of current through the sensing device 218 may be disrupted when current flow through the electrically conductive component 216 is interrupted as may occur when a fracture occurs in the body 102 at a location at which the electrically conductive component 216 extends. In addition, the signal emitter 220 may be in electrical communication with (or may be integrated with) the sensing device 218 such that when current flow through the sensing device 218 is interrupted, the signal emitter 220 may emit a wireless signal. That is, for instance, the signal emitter 220 may include a component that automatically outputs the wireless signal in response to the sensing device 218 being affected by a disruption in the current flow through the electrically conductive component 216.

At block 410, the controller 302 may execute the instructions 320 to arrange a battery 110 and/or a power converter 150 inside the body 102. The controller 302 may execute the instructions 320 to control the forming components 202 to arrange the battery 110 and/or the power converter 150 on one or more layers 208 of build materials as discussed above with respect to FIGS. 2A and 2B. The controller 302 may control the forming components 202 to electrically connect the battery 110 and/or the power converter 150 to the electrically conductive component 216, the sensing device 218, and the signal emitter 220. The battery 110 and/or the power converter 150 may thus supply power electrically conductive component 216, the sensing device 218, and the signal emitter 220. In other examples, such as the example shown in FIG. 1C, block 410 may be omitted and instead, the body 102 may be formed to include a slot 116 for insertion of a removable battery 114 following fabrication of the 3D printed object 130.

Some or all of the operations set forth in the method 400 may be contained as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A three-dimensional (3D) printed object comprising:
a body formed of an electrically non-conductive material;
an electrically conductive channel embedded within the body, wherein forming components of a 3D printer are to form the body and the electrically conductive channel;
a sensing device in electrical communication with the electrically conductive channel, wherein the sensing device is affected by a disruption in a current applied through the electrically conductive channel, said sensing device being embedded within the body; and
a signal emitter to emit a wireless signal in response to the sensing device being affected by a disruption in the applied current, said signal emitter being embedded within the body.

2. The 3D printed object according to claim 1, wherein the electrically conductive channel is formed of a mixture of the electrically non-conductive material and an electrically conductive agent.

3. The 3D printed object according to claim 1, further comprising:
a battery embedded in the body, wherein the battery is in electrical communication with the electrically conductive channel and the signal emitter and wherein the electrically conductive channel, the sensing device, the signal emitter, and the battery are surrounded on all sides by the electrically non-conductive material of the body.

4. The 3D printed object according to claim 1, further comprising:
a slot to receive a replaceable battery, wherein the electrically conductive channel includes connections that terminate at the slot to be in electrical communication with the replaceable battery when the replaceable battery is inserted into the slot.

5. The 3D printed object according to claim 1, further comprising:
a power converter to convert received inductive energy to electrical energy, the power converter being in electrical communication with the electrically conductive channel and the signal emitter.

6. The 3D printed object according to claim 1, wherein the electrically conductive channel comprises a loop forming an electrical circuit with the sensing device and extends through multiple areas of the body.

7. A method comprising:
controlling, by a processor, forming components of a three-dimensional (3D) printer to additively form a body from an electrically non-conductive material;
controlling, by the processor, the forming components to arrange an electrically conductive material inside the body to form an embedded electrically conductive component during additive formation of the body;
controlling, by the processor, the forming components to arrange a sensing device inside the body, said sensing device being connected to the embedded electrically conductive component to be affected by a disruption in a current applied through the embedded electrically conductive component; and
controlling, by the processor, the forming components to arrange a signal emitter inside the body, said signaling emitter being to emit a wireless signal in response to the sensing device being affected by a disruption in the current through the embedded electrically conductive component.

8. The method according to claim 7, wherein controlling the forming components to additively form the body further comprises:
controlling the forming components to additively form the body in multiple layers; and
controlling the forming components to form the embedded electrically conductive component on a layer of the multiple layers by mixing build material particles of the electrically non-conductive material in the layer with the electrically conductive material, wherein the electrically conductive material is a fluid.

9. The method according to claim 7, wherein controlling the forming components to additively form the body further comprises:
controlling the forming components to additively form the body in multiple layers; and
controlling the forming components to form the embedded electrically conductive component to extend among a plurality of layers of the multiple layers.

10. The method according to claim 7, wherein controlling the forming components to additively form the body further comprises:
controlling the forming components to additively form the body in multiple layers; and
wherein controlling the forming components to arrange the sensing device and the signal emitter further comprises controlling the forming components to mix build material particles of the electrically non-conductive material with fusing agents among a plurality of layers of the multiple layers to form the sensing device, the signal emitter, or both.

11. The method according to claim 7, wherein controlling the forming components to additively form the body further comprises:
controlling the forming components to additively form the body in multiple layers, wherein controlling the forming components to arrange the sensing device and the signal emitter further comprises placing the sensing device, the signal emitter, or both on a layer of the multiple layers, and continuing to form the body around the placed sensing device, signal emitter, or both.

12. The method according to claim 7, further comprising:
arranging a battery, an inductive energy to electrical energy power converter, or both inside the body.

13. An apparatus comprising:
forming components of a three-dimensional (3D) printer;
a controller to control the forming components to:
additively form a body from an electrically non-conductive material;
during additive formation of the body,
mixing the electrically non-conductive material with an electrically conductive material inside the body to form an embedded electrically conductive channel;
arrange a signal emitter inside the body, said signal emitter being connected to the embedded electrically conductive channel to be affected by a disruption in an electrical current applied through the embedded electrically conductive channel and to emit a wireless signal in response the signal emitter being affected by a disruption in the current applied through the embedded electrically conductive channel.

14. The apparatus according to claim 13, wherein the controller is to control the forming components to additively form the body in multiple layers and to arrange the electrically conductive channel and the signal emitter from, between, or both, of the multiple layers.

15. The apparatus according to claim 13, wherein the controller is further to control the forming components to arrange a battery, an inductive energy to electrical energy power converter, or both inside of the body.

* * * * *